H. A. BALLARD.
TREE.
APPLICATION FILED MAY 7, 1902.

1,106,438.

Patented Aug. 11, 1914.

6 SHEETS—SHEET 1.

H. A. BALLARD.
TREE.
APPLICATION FILED MAY 7, 1902.
1,106,438.
Patented Aug. 11, 1914.
6 SHEETS—SHEET 2.
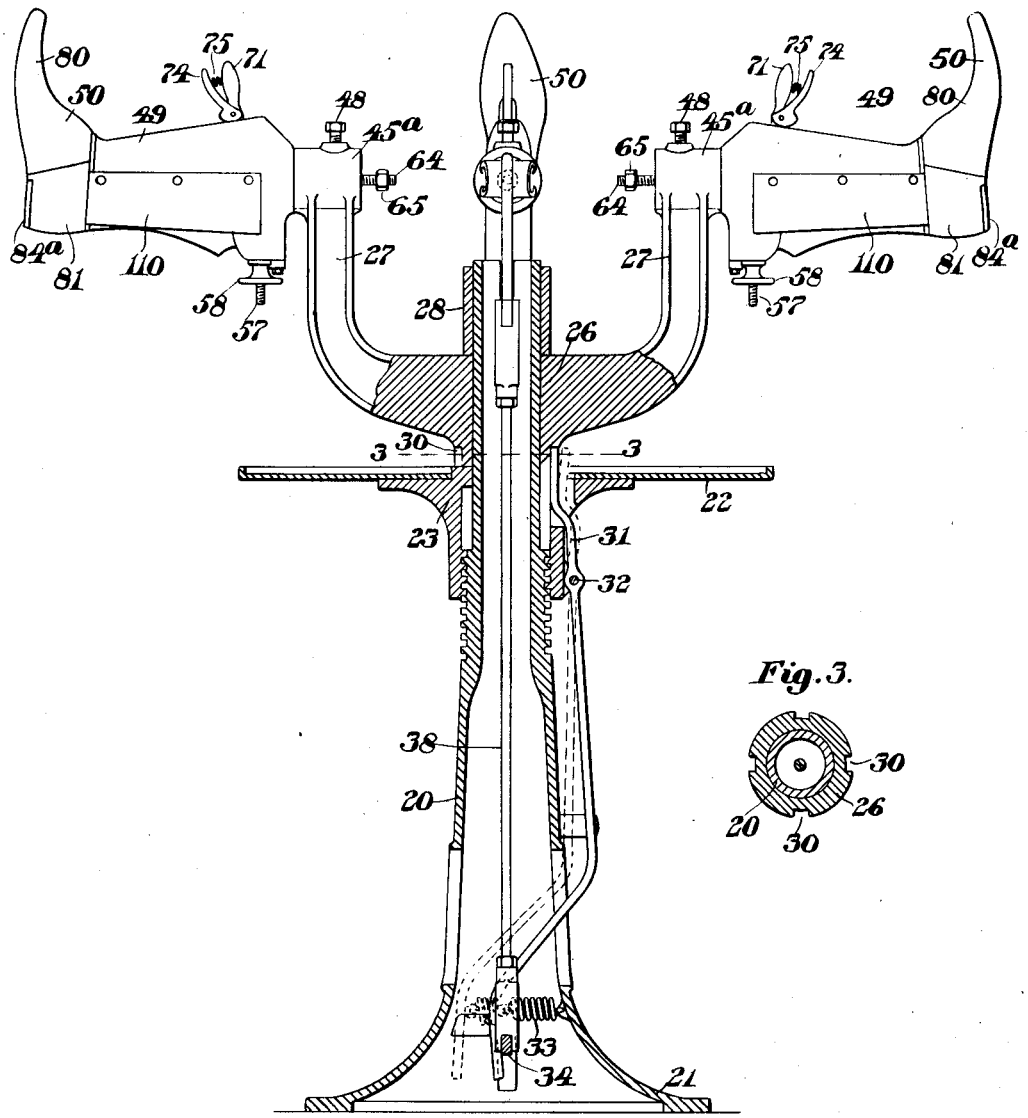

H. A. BALLARD.
TREE.
APPLICATION FILED MAY 7, 1902.
1,106,438.
Patented Aug. 11, 1914.
6 SHEETS—SHEET 3.
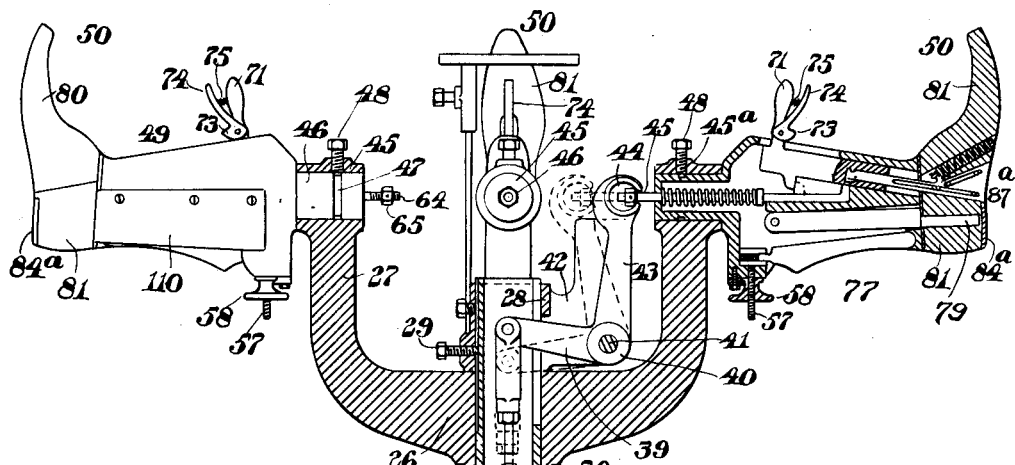
Fig. 4.
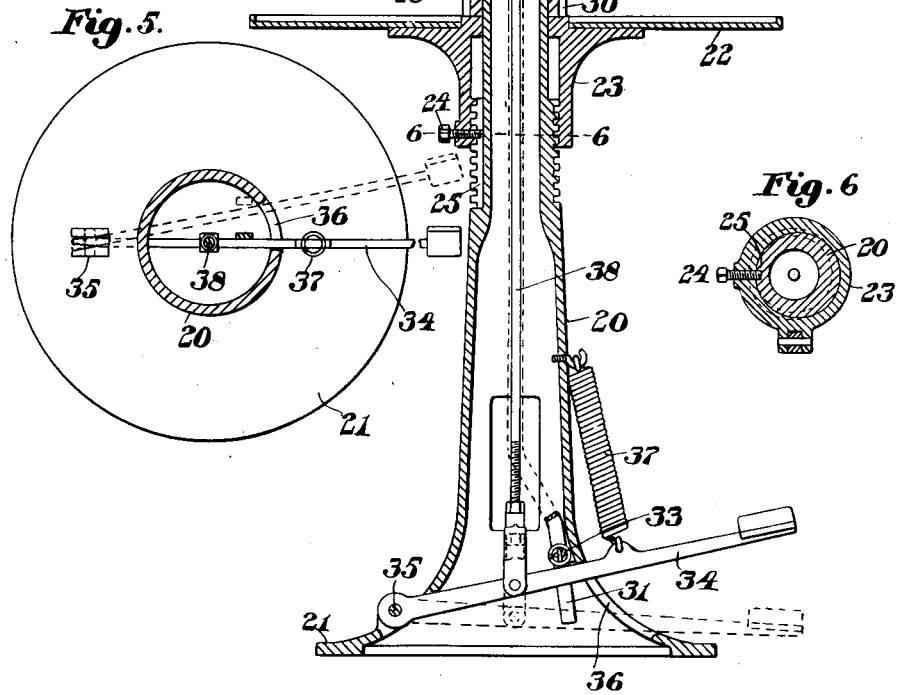
Fig. 5.
Fig. 6.
Witnesses:
Inventor:
H. A. Ballard
by Wright Brown & Dunlevy
his Attys.

H. A. BALLARD.
TREE.
APPLICATION FILED MAY 7, 1902.

1,106,438.

Patented Aug. 11, 1914.

6 SHEETS—SHEET 4.

Witnesses:

Inventor:
H. A. Ballard
by Wright Brown Quimby
his Attys.

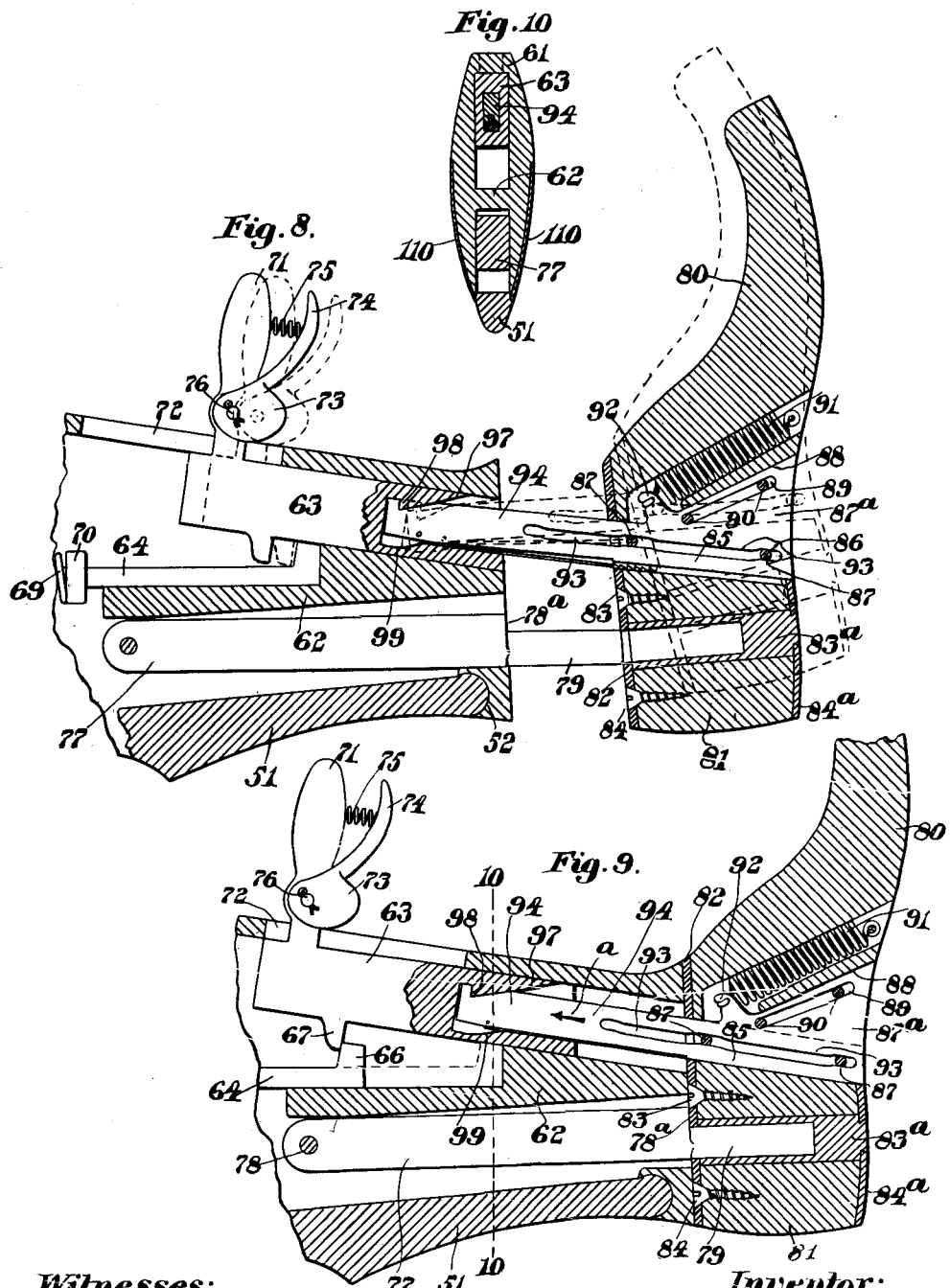

H. A. BALLARD.
TREE.
APPLICATION FILED MAY 7, 1902.
1,106,438.
Patented Aug. 11, 1914.
6 SHEETS—SHEET 6.
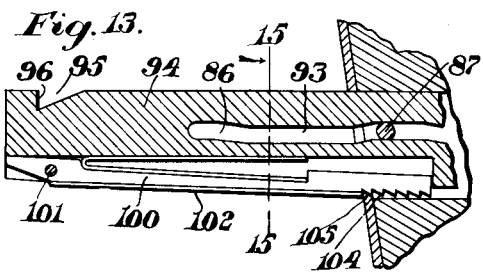
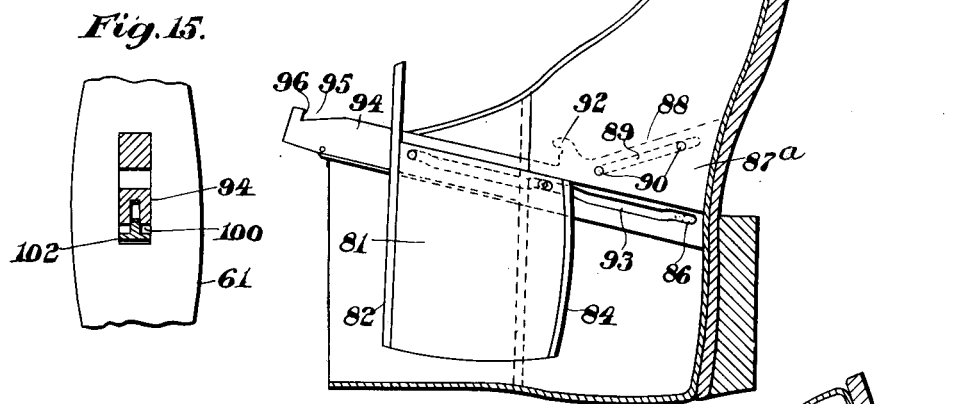
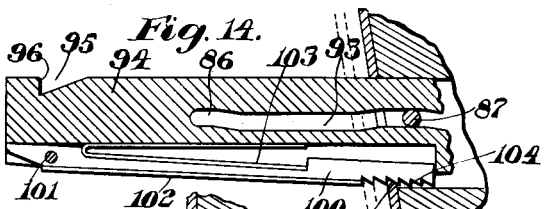
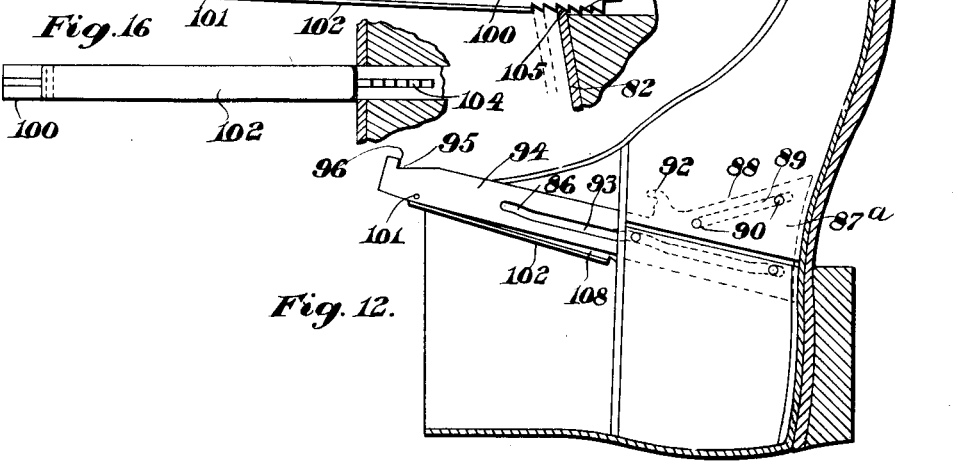
Witnesses:
Edwin P. Luce
Walter E. Lombard
Inventor:
H. A. Ballard
by Wright, Brown & Quinby
his Attys.

UNITED STATES PATENT OFFICE.

HARRIE A. BALLARD, OF ASHLAND, MASSACHUSETTS, ASSIGNOR, BY MESNE ASSIGNMENTS, TO THE BOYLSTON MANUFACTURING COMPANY, OF BOSTON, MASSACHUSETTS, A CORPORATION OF NEW JERSEY.

TREE.

1,106,438.      Specification of Letters Patent.      Patented Aug. 11, 1914.

Application filed May 7, 1902. Serial No. 106,263.

*To all whom it may concern:*

Be it known that I, HARRIE A. BALLARD, of Ashland, in the county of Middlesex and State of Massachusetts, have invented certain new and useful Improvements in Trees, of which the following is a specification.

This invention has for its object to produce a last which may be employed in a shoe during its entire process of manufacture, including the treeing operation.

It consists, therefore, (first) of a last adapted to be employed as such or as a follower (so called) having certain features of construction; (second) of a last adapted for attachment to a tree-leg and to become to all intents and purposes a part of the tree, with provisions whereby it may be expanded; and (third) a treeing stand and tree having certain improved features of construction and arrangement whereby their efficiency is enhanced.

Figure 1:
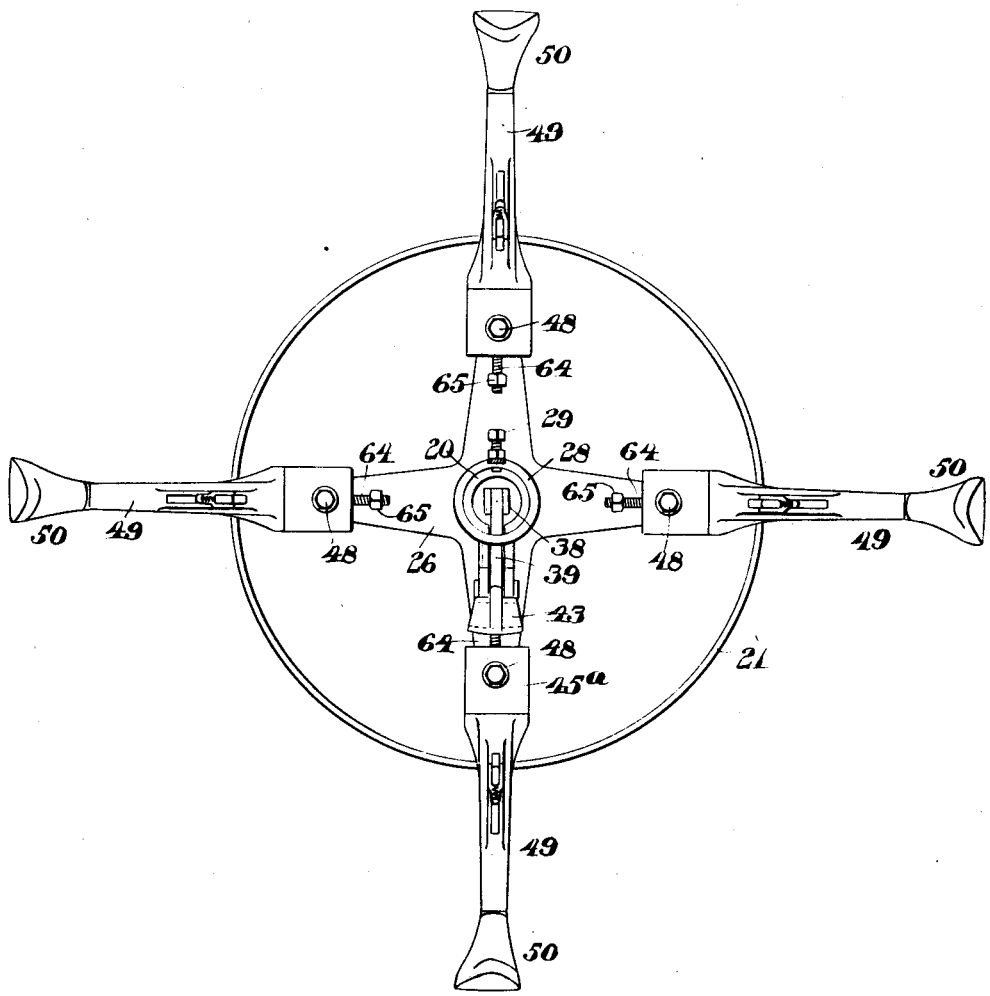
Figure 7:
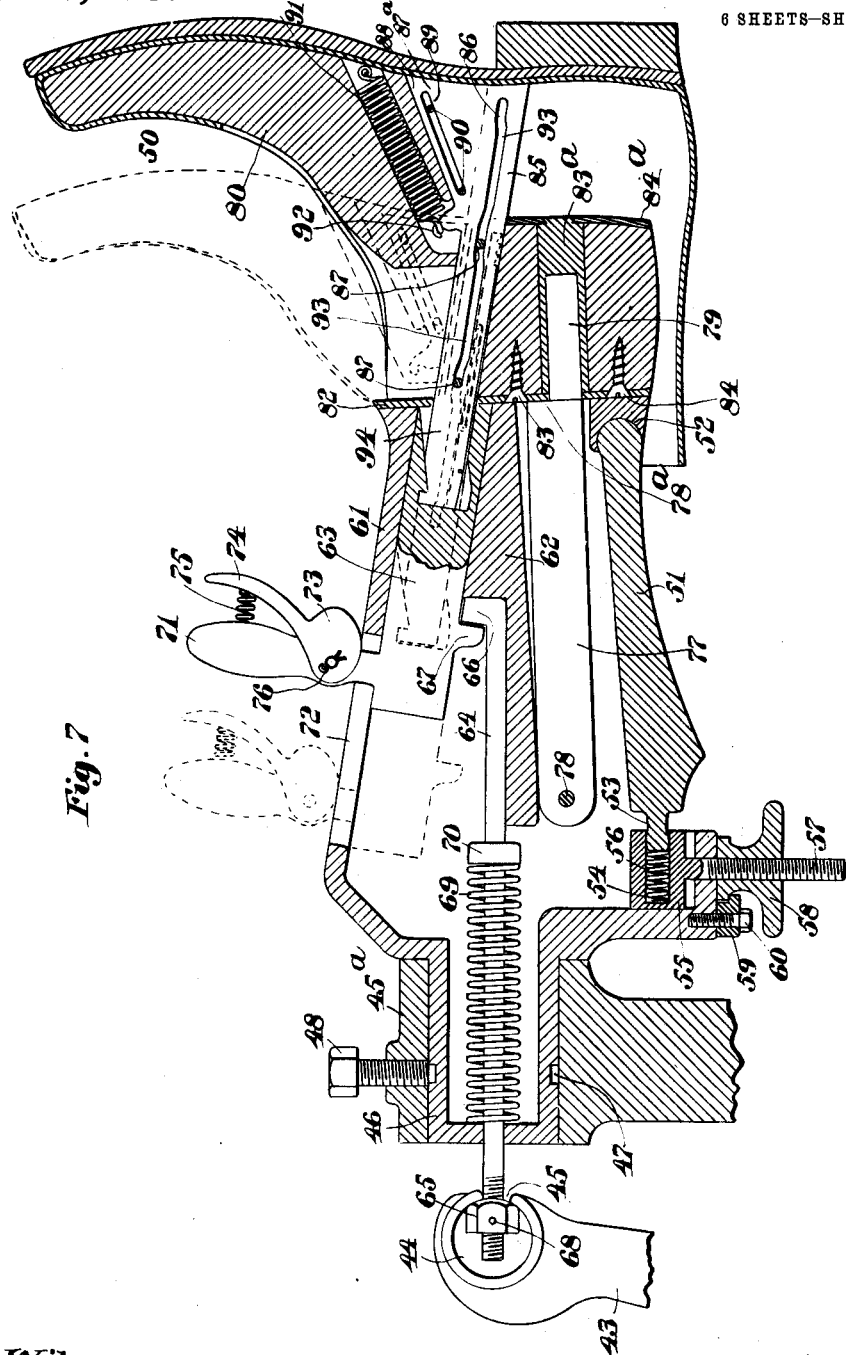

Referring to the accompanying drawings:—Figure 1 represents in plan view an improved treeing stand. Fig. 2 represents a vertical section through the same. Fig. 3 represents a section on the line 3—3 of Fig. 2. Fig. 4 represents a vertical section through the treeing stand on a plane at right angles to the plane of the section in Fig. 2. Fig. 5 represents a horizontal section through the base of the stand. Fig. 6 represents a section on the line 6—6 of Fig. 4. Fig. 7 represents a longitudinal vertical section through one of the trees and shows the forepart of the foot with the shoe thereon. Fig. 8 illustrates the manner of attaching the foot to the tree-leg. Fig. 9 illustrates the position of the parts with the foot attached to the tree. Fig. 10 represents a section on the line 10—10 of Fig. 9. Fig. 11 illustrates the manner of inserting the last into a shoe. Fig. 12 illustrates the position of the parts with the last in the shoe. Figs. 13, 14, 15 and 16 illustrate a block for the hollow or rear part of the last.

Referring to the drawings, which represent one embodiment of the invention, to the details of construction of which I am not limited, a treeing stand is illustrated as having the hollow column or standard 20 with the flaring base 21. To this column is adjustably secured a table 22, said table being attached to a sleeve 23 having a threaded connection with the column or standard and held against rotation after adjustment by a set-screw 24, adapted to take into a groove 25 in said column, as shown in Figs. 4 and 6.

Rotatively mounted upon the upper portion of the column or standard, and supported by the sleeve 23, so as to be adjustable therewith, is a turret indicated as a whole at 26 and having radial and upwardly projecting arms 27, of which there may be as many as desired. The turret is held against upward movement by a sleeve 28 rigidly and adjustably secured to the column or standard by a set-screw 29, taking into the groove therein, as illustrated in Fig. 4. The said turret is adapted to be rotated by hand to bring the shoes which are supported upon the arms 27 successively into operative relation to a treeing or ironing machine, located conveniently with respect to the stand.

The turret is adapted to be locked in as many different positions as there are trees or arms supporting them, and to this end the said turret is provided with locking notches 30, located in its periphery near its base, and adapted to be successively engaged by a latch 31 pivoted at 32 in the sleeve 23 and extending through an aperture in the flaring portion of the sleeve, as shown in Fig. 2.

The lower end of the latch is curved inwardly, so as to extend into the interior of the standard or column 20 and has connected to it a spring 33, the end of which is attached to the standard, as shown in Fig. 2, so as to yieldingly maintain the upper free end of the latch in locking engagement with one of the notches 30 or to cause it to engage one of said notches when permitted by the registration of a notch therewith. The lower end of the latch bears against a foot lever or treadle 34 which is pivoted at 35 to the base and extends outward through an aperture therein, as illustrated in Fig. 4. The pivotal connection of the lever with the base is of such a nature that the said lever may swing laterally as indicated in Fig. 5, the extent of its movement being limited by the width of the slot 36 in the base of the standard 20 through which the lever extends. The said lever is normally held at its upward extreme of movement by a helical spring 37 attached thereto and to a projection on the standard. This lever serves the function of expanding the trees as well as moving the latch 31 against the tension of the spring 33 to release the turret and permit it to be rotated.

For the purpose of expanding the trees, there is connected to the lever 34 an adjustable rod 38, which is located within the hollow standard and which is connected at its upper end with the substantially horizontal arm 39 of a bell-crank lever indicated as a whole at 40. This said lever is fulcrumed upon a stud 41 passed through two parallel lugs 42 projecting from the sleeve 28 between which the bell-crank is adapted to move and which hold said bell-crank against lateral movement. The arm 39 of the bell-crank extends into the interior of the standard through an elongated slot formed therein as shown in Fig. 4. The upright arm 43 of the bell-crank is formed at its upper end with a socket or recess 44, having a narrow throat 45, through which the ends of the leg spindles are adapted to pass laterally as illustrated in Fig. 7.

The bell-crank is so located with reference to the locking notches in the turret that at the end of each partial rotation of the turret, one of the spindles is in operative engagement with the bell-crank so that by the depression of the arm 39, the bell-crank may be swung about its fulcrum 41 and the spindle moved longitudinally.

The upper part of each of the arms 27 of the turret 26 forms a bearing, the axis of which is horizontal and radial to the axis of rotation of the turret, said bearings being indicated at 45ª. In each of said bearings is journaled a cylindrical end 46 of a tree-leg, each end having a groove 47 with which the end of the screw 48 may be engaged for holding the tree-leg against longitudinal movement and at the same time permitting it to rotate freely.

The mechanism as thus described constitutes together with the trees my improved treeing stand, and I will now proceed to describe one of the trees and its detachable foot, which foot consists in itself of a last or follower according to the use to which it is put in the manufacture of the shoe.

Each of the trees is formed with a leg 49 and a foot 50, as shown in Fig. 2. The leg portion of the tree will first be described, and then the foot portion which is detachable to form the last or follower.

Referring now to Fig. 7, the leg is preferably formed of cast-metal and is hollow, as shown. It is provided with the adjustable back 51, having a pivotal, or ball and socket connection as at 52 with the leg near the outer end thereof. The inner or movable end of the back is provided with a head 53, located in the socket 54 in a block 55. A spring 56 is located in the socket and bears against the end of the back so as to hold its spherical end in the complemental socket 52. Attached to the block 55, there is a screw 57 with which is operatively engaged a nut 58, taking bearing against the rear portion of the leg and held in place by a gib 59 and screw 60. By rotating the nut 58, the block 55 and therefore the back 51, may be adjusted with relation to the leg so as to expand or contract the latter in lines from front to rear. The end of the leg is flat so as to receive a foot or last. In a slideway afforded by the front wall 61 of the leg and a rib 62, located in the leg, there is a slide 63 which is adapted to move in the direction of its length at an inclination to the longitudinal median line of the leg, the angle being comparatively sharp for a purpose to be described. For moving said slide, a spindle 64 is passed through an aperture in the rear end of the leg and is provided on its end with a hook 66 to engage a lug or projection 67 on said slide. The end of the spindle which projects beyond the cylindrical end 46 of the leg is provided with a head 65 which may consist of a nut in threaded engagement with said spindle and adapted to be held in place by a small screw 68. It is this head 65 that is adapted to enter the socket 44 in the end of the arm 43 of the bell-crank on the treeing stand.

A compression-spring 69 is coiled upon the spindle, one end bearing against the end of the tree and the other bearing against a shoulder or collar 70 on the spindle. When the bell-crank arm 43 is swung away from the end of the tree-leg, the spindle moves the slide from a full-line position in Fig. 7 to the dotted position, at which place it may be locked by a device now to be described.

The slide 63 is provided with a handle 71, projecting through a slot 72 in the front wall of the leg, and to this handle is pivoted a cam or eccentric lock 73 having a handle 74 between which and the handle 71 is interposed a compression spring 75. The spring 75 tends to throw the cam-lock about its pivot 76 and engage it with the front wall of the leg, so as to hold the slide in any position to which it may be moved. To release said slide and permit its moving to the full line position in Fig. 7, the operative grasps the handle 71 with the fingers and the handle 74 with the thumb of his hand, and forces them together to disengage the cam-lock from the front of the leg.

The leg is provided with the movable last-supporting spindle 77, which is pivoted at its inner end as at 78, and which is adapted to play back and forth between the rib 62 and the back of the leg. The said spindle has a shoulder 78ª flush with the flat end of the leg, and with a pin 79 projecting beyond said shoulder to receive the heel-portion of the foot.

The foot or last consists of two parts, namely,—the forepart 80 and the rear or heel-part 81. They are divided on a plane transverse to the plane of the top of the last, the inclination of the plane of their division being parallel to the lines of movement of the slide 63 so that they have obliquely inclined confronting faces. To the heel part is secured a plate 82 by means of screws 83, 84. The said plate is of the shape of the entire top of the last and is adapted to fit snugly against the flat end of the leg, as shown in Figs. 7 and 9. In the heel-part is secured a metallic socket 83$^a$ to receive the pin 79, and the end of the socket 83$^a$ is riveted or otherwise secured to a metallic plate 84$^a$ which covers the bottom of the heel-part. The socket is adapted to receive the spindle of a jack and with the plate 84$^a$ affords a solid clenching base when the shoe is passed through the nailing operation.

The forepart 80 of the foot is provided in its inclined face with a groove for the reception of a connecting member which takes the form of a plate 85 having a longitudinal groove 86 through which parallel studs 87 are passed into the heel-part. The major portion of the slide or plate 85 lies in a groove in the inclined face of the rear or heel part 81. The plate has a wedge or angular portion 87$^a$ which extends into the groove in the forepart, and whose edge 88 is at an obtuse angle to the general direction of the slot 86. The said portion 87$^a$ has a slot 89 through which studs 90 are passed into the fore-part. A spring 91 located in a socket in the fore-part and engaging with a hook 92 on the slide-member 85 holds the said member in the position shown in Fig. 7 with relation to the fore-part. When the fore-part and heel-part are in the position shown in Fig. 9, a movement of the slide member in the direction of the arrow $a$ will tend to separate the heel-part and the fore-part on a line substantially parallel to the plane of the sole, or in other words, will wedge or force the forepart away from the heel-part to the extent that is necessary in a tree. The general movement of the fore-part relatively to the heel-part in the lines of movement at an inclination to the top will tend to shorten or extend the tree-foot. When the fore-part is in the abnormal position shown in Fig. 7, the shoe may be readily placed thereon, as illustrated, and the movement of said fore-part to the normal or dotted line position will effect the entrance of the heel-part into the shoe and the lengthening of the entire foot so as to completely fill the shoe. A further movement of the slide member 85 will effect a still greater extension of the foot for the stretching of the shoe.

The two parts of the foot should fit tightly against each other at their abutting surfaces, but to permit the free movement of the fore-part, the slot 86 is offset as at 93, so that after the initial movement of the fore-part away from the dotted position in Fig. 7 toward the full line position, said fore-part will be separated slightly from the heel-part so that it will move or slide freely and without resistance.

The connecting member or slide 85 and the slot 86 are of such length that the fore-part of the foot may have a long movement relatively to the heel part, or a movement much greater than if the said slide were no longer than the distance from the top to the bottom of said foot. It will be further observed that the connecting member or slide 85 is slidingly connected with each part of the foot by a pin and slot connection, and that there are two separated pins connecting the said member with each part of the foot, so that the foot pieces are connected together much more rigidly and form a much stronger structure, when locked together as hereinafter described, than where but a single pin is employed to connect one of the parts to said member.

The end 94 of the slide member projects through an aperture in the plate 82 as best shown in Fig. 12, and it is provided with an angular notch 95 which forms a shoulder 96. The end of the slide 63 is formed with a socket having the inclined wall 97, the shoulder or hook 98, and the inclined wall 99. The slide 63 with its socket and the slide 85 with its shoulder in the end 94 thereof constitute complemental locking members.

In order to secure the foot to the leg, the foot is held in the position shown in dotted lines in Fig. 8, and the end 94 of the slide member 85 is introduced into the socket in the end of the slide 63. Then the whole foot is moved to the full-line position so as to engage the shoulder 96 with the shoulder 98 which brings the socket in the heel-part into alinement with the pin 79 on the foot-supporting spindle 77. The heel-part is then forced toward the end of the leg, so as to bring the plate 82 snugly thereagainst. If the head 65 of the spindle 64 is engaged with the socket in the bell-crank, said bell-crank may be rocked by the treadle to bring the fore-part up solidly against the plate 82, as shown in full lines in Fig. 9. A still further movement of the foot-lever will expand the foot, as previously explained.

In order to lock the fore-part to the heel-part when the foot is employed alone, as a last, a locking member is provided as shown in Figs. 12 to 16. This member is indicated at 100. It is pivoted as at 101 in a slot in the slide member 85 and it has a flanged back 102 by which it may be forced with the thumb against the pressure of the V-shaped spring 103, located between said member and the bottom of the groove or socket in which it is located. The said member is provided with a series of locking or rack-teeth 104, any one of which may be engaged with the beveled wall 105 of the aperture in the plate 82.

By pressing in the member 100, its teeth may be disengaged from the top-plate 82 so as to permit the heel part to slide relatively to the fore-part, as shown in Fig. 11. When the foot is attached to the leg, the movement of the foot from the dotted position in Fig. 8 to the full line position causes the engagement of the said locking member 100 with the wall of the slide, so as to press said member in and hold it automatically in inoperative position so as to permit the free movement of the fore part of the foot. The slide 63 and the slide-member 85, although separable and detachable, form an inclined slide for the operation of the fore-part and the expansion of the foot.

By the language which is employed in describing the particular embodiment of the invention illustrated in the drawings, there is no intention of limiting the scope of the invention, nor is the invention to be construed as limited to the particular details or forms of parts which I have seen fit to illustrate and describe.

The invention is capable of many uses, either as a whole or when divided into its separate parts. As previously stated, the foot may be employed throughout the manufacture of the shoe and finally become a part of the tree in the process of treeing or ironing the shoe, being again readily detachable from the tree-leg, if it be desired to subject the shoe to other finishing processes.

As set forth in a co-pending application filed September 26, 1902, Serial No. 124,879, the projecting slide-member may be employed for suspending the foot when it is detached from the leg, said member being long enough to project beyond the top of the boot or shoe.

The sides of the leg may be provided with brasses, 110, so called, which overlap the back 51 or the said back may be formed as set forth in the copending application, Serial No. 105,938 filed May 5, 1902.

Having thus explained the nature of the invention and described a way of constructing and using the same, although without attempting to set forth all of the forms in which it may be made, or all of the modes of its use, I declare that what I claim is:—

1. In combination, a tree having a leg, a locking member located in said leg, a two-part foot comprising a heel and a forepart, and a complemental locking member connected to the forepart and adapted for engagement with the member in the leg whereby the leg and foot are secured together, said members being substantially parallel with the plane of division of the forepart and the heel part.

2. In combination, a tree having a leg, a movable locking member located in the leg, a foot comprising a forepart and a heel part, and a complemental locking member on the foot adapted for engagement with the member in the leg, the first-mentioned member being movable in parallelism with the plane of division of the heel part and forepart of the foot.

3. In combination, a tree having a leg, a foot having a heel part and a forepart movable relatively to each other, means for attaching the heel part to the end of the leg, and means in the leg for moving the forepart relatively to the heel part and to the front portion of the leg.

4. A tree comprising a leg, a last having a top complemental to the end of the leg, said last having a heel-part and a fore-part, divided from each other on a plane inclined from the bottom of the last upward and forward, means for attaching the heel part to the end of the leg, and means in said leg for moving said fore-part transversely of the adjacent end of the leg.

5. A tree comprising a leg, a last having a top complemental to the end of the leg, said last having a heel-part and a fore-part divided from each other on a plane inclined from the bottom of the last upward and forward, means for attaching the heel part to the end of the leg, an operating spindle or slide in said leg having means for attachment to said fore-part, and means for causing longitudinal relative movement of said heel-part and fore-part.

6. A tree comprising a leg and a detachable foot, the entire foot including its heel and fore-part being divided from the leg by a cut transverse to the length of the leg, and means connected to the said tree and to the said foot and movable longitudinally of the said tree for expanding said foot longitudinally of the sole thereof.

7. A tree comprising a leg, a detachable foot having a heel-part and a fore-part, and means for expanding said foot longitudinally of the sole thereof, the said means also serving to secure the said foot to the leg.

8. A tree comprising a leg, a detachable foot having a heel-part and a fore-part, means on the foot for expanding it longitudinally of the sole, and devices in the leg for coaction with said means.

9. A tree comprising a leg, a detachable foot having a heel-part and a fore-part, an expansion member in said foot, and a slide in said leg to which said expansion member is detachably connected.

10. A tree comprising a leg, a last having a top complemental to the end of the leg, said last having a heel-part and a fore-part, divided from each other on a plane inclined from the bottom of the last upward and forward, means for attaching the heel part to the end of the leg, an inclined slide in said leg movable in lines coincident with or parallel to the lines of movement of said fore-part, and provisions for detachably connecting said fore-part to said slide.

11. A tree comprising a leg, a foot piece or fore-part movable in a line inclining to the sole thereof to operative position with relation to the leg, and means for imparting to said foot-piece or fore-part a movement longitudinal of the sole, the said means being in engagement with the foot-piece and being movable transversely thereof.

12. A tree comprising a leg, a detachable foot having a transversely divided forepart and heel-part one of which is movable relatively to the other in lines parallel to the plane of their division, and means in engagement with the said foot intermediate the fore-part and heel-part for separating said fore-part and heel-part to elongate said foot.

13. A tree-leg having a movable foot supporting spindle, and having a slide adapted for attachment to the fore-part of a foot.

14. A tree having a leg, a detachable foot having relatively movable fore and heel parts, a spindle for engaging the heel part to hold it in operative relation to the leg, a slide member connected to the fore part to move it relatively to the heel part while the latter is in its operative relation to the leg, and an operating rod having a hook-connection with the slide member.

15. A tree having a leg, a movable foot-piece, means in the leg for moving said foot-piece toward and from the end of the leg, and means projecting from the top of the foot-piece and adapted to be secured to said means.

16. A tree having a leg, a movable foot-piece, a movable slide in the leg having means by which it may be moved by the operator, and means secured to the foot-piece and adapted to be connected to the slide so that said foot-piece may be moved by said slide.

17. A tree having a leg, a detachable movable foot-piece, a slide in the leg, a device secured to the said foot-piece for connecting said foot-piece with said slide, said device and slide having coöperative interlocking portions for detachably connecting them, and a means connected to said slide to move said foot-piece to operative position relatively to said leg.

18. A tree having a leg, a movable foot-piece, a slide in the leg connected to said foot-piece, and a lock for said slide, the said lock coöperating with a portion of said leg.

19. A tree having a leg, a movable foot-piece, a slide in the leg connected to said foot-piece, a handle on the slide, and a lock for said slide arranged in proximity to said handle.

20. A tree comprising a leg, a foot-piece, a member connected to the foot-piece, and provisions whereby a movement of said member will move the foot-piece in lines longitudinal of the leg from abnormal to normal position, and a further movement of said member will move said foot-piece in lines transverse to the described lines of movement of said foot-piece.

21. A last comprising a fore-part, a heel-part, and a member slidingly connected to both said parts and constructed and arranged to move with one of said parts transversely relatively to the other part, and to separate said parts longitudinally when said member is moved relatively to both parts.

22. A last transversely divided on a plane at an inclination to the sole, to form a fore-part and a heel-part, whereby one of said parts may be moved relatively to the other transversely of the sole, and having means for separating said parts in lines longitudinal of the sole, the longitudinal separation of said parts being independent of the transverse movement of either of them.

23. A last transversely divided on a plane at an inclination to the sole to form a fore-part and a heel-part, and a member slidingly connecting said fore-part and heel-part, and having auxiliary means for expanding said last longitudinally of the sole.

24. A last comprising a fore-part and a heel-part, one of which is adapted to be moved to abnormal position with respect to the other, and means intermediate the fore-part and heel-part for separating said parts in lines longitudinal of the sole when occupying normal positions.

25. A last comprising a fore-part, a heel-part, and means located intermediate the fore-part and heel-part for separating said parts in lines longitudinal of the sole when the bottoms thereof coincide.

26. A last comprising a fore-part, a heel-part, a slide-member, having slots at an angle to each other, and pins in said fore-part and said heel-part passing through said slots.

27. A last comprising a fore-part, a heel-part, a slide member, having a pin and slot connection with one of said parts, and having a wedge in operative engagement with the other of said parts.

28. A last comprising a fore-part, a heel-part, a slide-member having slots at an angle to each other, pins in said fore-part and said heel-part passing through said slots, and a spring connecting said slide-member with one of said parts.

29. A last comprising a fore-part, a heel-part, a plate secured to the top of said heel-part and overlapping the top of said fore-part, said parts being relatively movable from top to bottom, and a member connected to said fore-part, said plate and member having coöperative sliding portions for preserving longitudinal relation of said fore-part and heel-part.

30. A last comprising a fore-part, a heel-part, a slide member connected to said parts by which one may be moved to abnormal position with respect to the other, and a lock on said slide member for locking said parts in normal position.

31. In a treeing machine, in combination, a tree leg, a slide located in said leg, a foot having means which is adapted to be secured to said slide so that it may be moved into and out of position thereby, and a locking device secured to said slide and coöperating with a portion of the leg for holding the latter in any desired position.

32. In a treeing machine, in combination, a tree leg having a slot in the front portion thereof, a slide located in the said leg and adapted to have a detachable foot connected thereto, a handle secured to said slide and projecting through the said slot, and a locking device secured to the said handle.

33. In a treeing machine, in combination, a tree leg having a slot in the front portion thereof, a slide located in the said leg having a socket in one of its ends, a detachable foot having a slide member adapted to engage the said socket, and means connected to the said slide and projecting through the slot in the leg, by means of which the said slide may be manually operated.

34. In a boot treeing machine, a boot tree having a longitudinally movable and expansible foot piece adapted to be moved into and out of position without expanding the same, and means for moving the same without effecting the expansion of said foot piece.

35. A divided last comprising a fore-part and a heel-part having obliquely inclined confronting faces, a connecting plate seated in grooves in said faces, means for slidingly connecting said plate with each of said parts, and means for occasioning movement of said fore-part and heel-part in the direction of the length of the last.

36. A divided last, comprising a fore-part and a heel-part having confronting faces, with grooves therein, a plate arranged longitudinally of the last and seated in said grooves, a pin and slot connection between the fore-part and the plate, a pin and slot connection between the heel-part and the plate, and means for occasioning movement of said plate transversely of the last.

37. A divided last, comprising a fore-part and a heel-part having complemental confronting faces, with grooves therein, a plate arranged in said grooves, two separated pins in the fore-part and two separated pins in the heel part, said plate having slots to receive said pins and permit a relative movement between said plate and each of the said parts of said last, and means whereby such relative movement may occasion movement of one of said parts in the direction of the length of the last.

38. A boot tree having a longitudinally movable and expansible foot-piece adapted to be moved into and out of position without expanding the same and means for moving the said foot-piece without expanding the same, the said means being also adapted to occasion expansion of said foot-piece.

39. A tree having a longitudinally movable foot-piece adapted to be moved into and out of position, means for occasioning the movement of the said foot-piece into and out of position and means for occasioning expansion of the said foot-piece after it has been moved into position.

40. A tree comprising an expansible foot divided into a fore-part and a heel-part, means for occasioning longitudinal movement of the fore-part into and out of position without expanding the foot and means for occasioning movement of one of the said parts to expand the said foot.

41. A tree comprising a leg, a foot having a heel-part and a fore-part, means for occasioning relative movement of said heel-part and fore-part in the direction of the length of the leg, and means for expanding the said foot in the direction of its length.

42. A tree comprising a leg, an expansible foot having a heel-part and a fore-part, means for occasioning relative movement of said heel-part and fore-part in the direction of the length of the leg, and means having sliding engagement with one of said parts for expanding the said foot.

43. A tree comprising a leg, a foot having a heel-part and a fore-part, an expansion member in said foot, a movable member in said leg to which said expansion member is connected and means for occasioning movement of said expansion member transversely of the said foot.

44. A tree comprising a leg, a foot having a heel-part and a fore-part, an expansion member in said foot having a sliding connection with one of said parts and means in said leg for co-action with said member.

45. A tree comprising a leg, a foot having a heel-part and a fore-part, a movable expansion member in said foot, the said member having a sliding connection with said heel-part, and means for occasioning movement of said member transversely of said foot.

46. In a treeing machine, the combination of a leg, a spindle, means for actuating the spindle, a slide in the leg co-acting with said spindle, a detachable foot-piece, and means for detachably connecting the said foot-piece to said slide.

47. In a divided last, heel and toe portions provided respectively with internal keyways; and a sliding connecting member or key extending from one portion to the other and engaged in said key-ways.

48. A divided last comprising tow sections having obliquely inclined confronting faces, one of said sections being bodily movable at an inclination to the other, and a connecting plate slidingly connected with both said sections.

In testimony whereof I have affixed my signature, in presence of two witnesses.

HARRIE A. BALLARD.

Witnesses:
MARCUS B. MAY,
P. W. PEZZETTI.